(12) United States Patent
Shiu et al.

(10) Patent No.: US 9,664,555 B2
(45) Date of Patent: May 30, 2017

(54) ELECTRONIC DEVICES WITH LIGHT SENSORS

(71) Applicant: Apple Inc., Cupertino, CA (US)

(72) Inventors: Boon W. Shiu, San Jose, CA (US); David Lin Lee, Cupertino, CA (US); Michael DiVincent, Discovery Bay, CA (US)

(73) Assignee: Apple Inc., Cupertino, CA (US)

( * ) Notice: Subject to any disclaimer, the term of this patent is extended or adjusted under 35 U.S.C. 154(b) by 970 days.

(21) Appl. No.: 13/718,850

(22) Filed: Dec. 18, 2012

(65) Prior Publication Data

US 2014/0166867 A1   Jun. 19, 2014

(51) Int. Cl.
   *G01J 1/02*   (2006.01)
   *G01J 1/04*   (2006.01)
   *G01J 1/42*   (2006.01)
   *H04M 1/22*   (2006.01)

(52) U.S. Cl.
   CPC ........... *G01J 1/0271* (2013.01); *G01J 1/0425* (2013.01); *G01J 1/0444* (2013.01); *G01J 1/4204* (2013.01); *G01J 1/4228* (2013.01); *H04M 1/22* (2013.01)

(58) Field of Classification Search
   CPC .................. H04M 2250/52; H04M 1/0264
   USPC ......................... 250/214 B; 385/14
   See application file for complete search history.

(56) References Cited

U.S. PATENT DOCUMENTS

| | | | |
|---|---|---|---|
| 4,847,606 A * | 7/1989 | Beiswenger | G06F 3/0421 341/31 |
| 7,088,343 B2 | 8/2006 | Smith et al. | |
| 8,452,382 B1 * | 5/2013 | Roth | A61B 5/6887 600/309 |
| 2008/0237347 A1 * | 10/2008 | Wolf | G06F 1/1626 235/454 |
| 2009/0091710 A1 * | 4/2009 | Huebner | 353/28 |
| 2009/0259969 A1 | 10/2009 | Pallakoff | |
| 2009/0316244 A1 * | 12/2009 | Hwang | 359/204.1 |
| 2010/0203924 A1 * | 8/2010 | Hirota | 455/566 |
| 2010/0273530 A1 * | 10/2010 | Jarvis | F16F 1/027 455/566 |

(Continued)

OTHER PUBLICATIONS

Silicon Labs, Optical Proximity Detector Si1102, Nov. 2010.*
Butler et al., "SideSight: Multi-"touch" interaction around small devices", Microsoft Research, Cambridge UK, Oct. 2008.

*Primary Examiner* — Renee Chavez
(74) *Attorney, Agent, or Firm* — Treyz Law Group, P.C.; Zachary D. Hadd

(57) ABSTRACT

Electronic devices may be provided with light sensors. Light sensors may be proximity sensors or ambient light sensors. Proximity sensors may include a light-emitting component and a light-sensitive component. The electronic device may include an enclosure formed from housing structures and some or all of a display for the device. The enclosure may include openings such as openings formed from clusters of smaller openings. Each light sensor may receive light through one of the clusters of openings. The light sensor may receive the light directly through the openings or may receive light that passes through the openings and is guided to the light sensor by light guiding structures. The light guiding structures may include fiber optic structures or light-reflecting structures. Fiber optic structures may fill or partially fill the openings. Light reflecting structures may be machined cavities in an internal support structure.

22 Claims, 13 Drawing Sheets

(56) References Cited

U.S. PATENT DOCUMENTS

| | | | |
|---|---|---|---|
| 2011/0012845 A1* | 1/2011 | Rothkopf | G06F 3/044 345/173 |
| 2011/0087963 A1 | 4/2011 | Brisebois et al. | |
| 2011/0109577 A1 | 5/2011 | Lee et al. | |
| 2011/0248152 A1* | 10/2011 | Svajda | G01S 3/7803 250/221 |
| 2011/0291943 A1 | 12/2011 | Thorn et al. | |
| 2011/0312349 A1* | 12/2011 | Forutanpour | G06F 1/1626 455/466 |
| 2014/0078389 A1* | 3/2014 | Merz | 348/375 |

* cited by examiner

ELECTRONIC DEVICES WITH LIGHT SENSORS

BACKGROUND

This relates generally to electronic devices, and more particularly, to electronic devices with light sensors.

Electronic devices such as portable computers and cellular telephones are often provided with user input devices such as buttons, switches and touch-sensitive displays.

User input devices such as buttons and switches are often mounted in holes in a device housing or in holes in a portion of a display for the device. This type of hole for a button or a switch can sometimes be as large as a typical user's finger.

User input devices such as touch-sensitive displays are typically formed on a front face of the device. Touch sensitive displays commonly include capacitive or resistive touch-sensitive circuitry for gathering touch-based user input.

However, in some situations it can be desirable to gather user input from locations on the device in which it is challenging to accommodate macroscopic holes for buttons and/or switches and which may not be suitable for capacitive or resistive touch-sensor circuitry. It can therefore be challenging to gather user input data such as the position of a user's hand on a handheld device using conventional user input devices.

It would therefore be desirable to be able to provide improved electronic devices.

SUMMARY

Electronic devices may be provided with light sensors. Light sensors may include ambient light sensors, proximity sensors, or other light sensitive components. The electronic device may include tens, hundreds, or thousands of light sensors.

An electronic device may have an enclosure formed from housing structures and, if desired, a display. Light sensors and other electronic components such as printed circuit boards may be mounted within the enclosure. The light sensors may receive light through openings or clusters of openings in the enclosure. The light sensors may receive light directly through the openings or via light guiding structures such as reflective cavities or fiber optic structures that guide the light from the openings to the light sensors. The light sensors may be attached to a printed circuit board in the enclosure.

The light sensors may be formed along an edge of the enclosure, may be distributed under the display, may be distributed under a rear surface of the device or may be distributed behind substantially all of the exterior surfaces of the device.

The device may include an internal support structure. Light guiding structures such as reflective cavities may be machined into the internal support structure. A light sensor may be mounted within each machined reflective cavity in the internal support structure. User input data may be gathered using the light sensors.

Further features of the invention, its nature and various advantages will be more apparent from the accompanying drawings and the following detailed description of the preferred embodiments.

DETAILED DESCRIPTION

An electronic device may be provided with light sensors and other circuitry mounted in an enclosure. The enclosure may be formed from housing structure and, if desired, some or all of a device display. The enclosure may include openings that allow light to pass through the enclosure to and/or from the light sensors. Light sensors may include proximity sensors, ambient light sensors, or other sensors. Ambient light sensors may be configured to sense light having optical wavelengths. Proximity sensors may include a light-emitting component and a light-sensitive component. The light emitting component may be an infrared light emitting component such as an infrared light-emitting diode. The light-sensitive component may be an infrared light sensing component configured to sense reflected portions of infrared light that has been emitted by the light emitting component.

Figure 1:
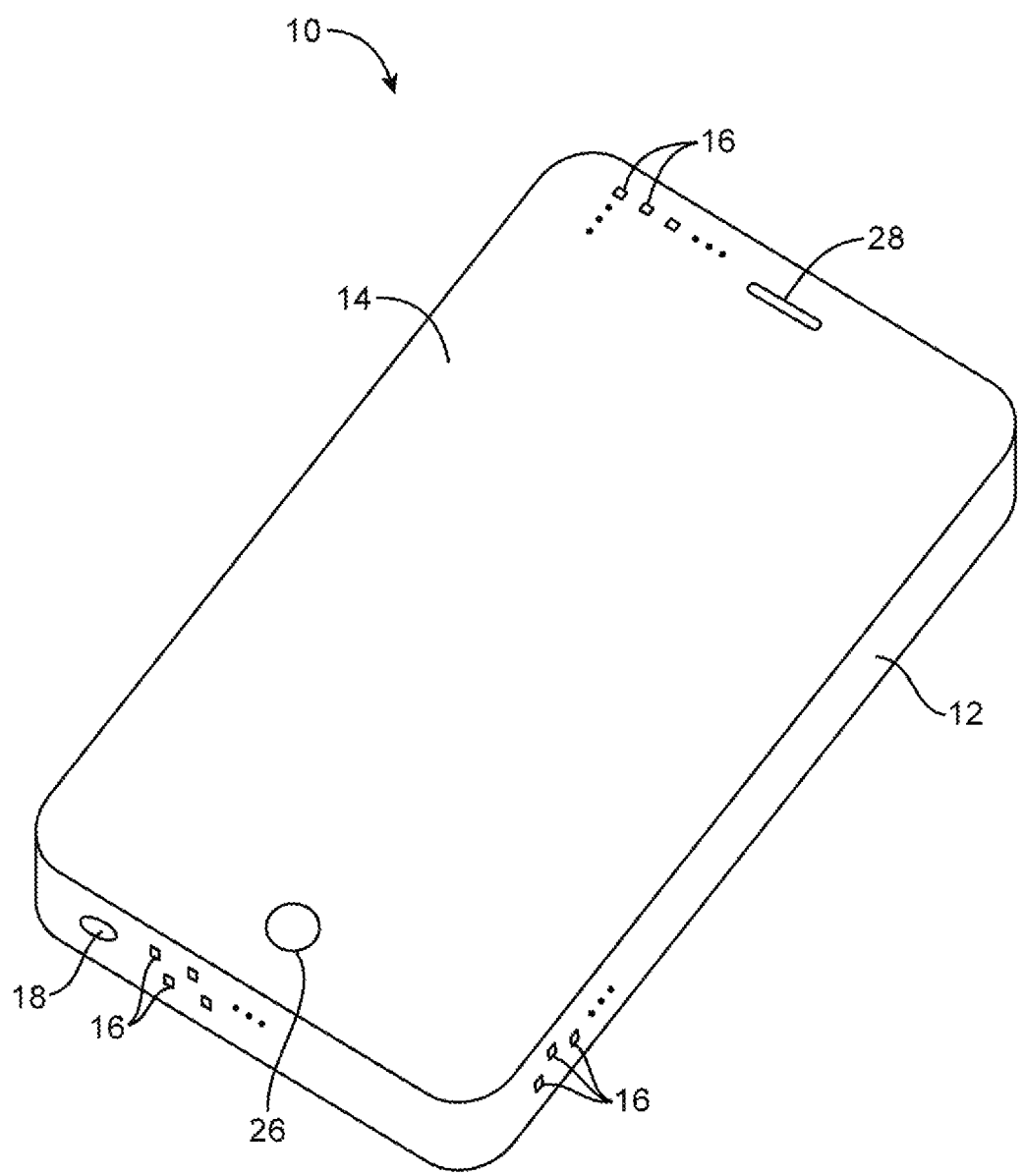
FIG. 1 is a perspective view of an illustrative electronic device with light sensors in accordance with an embodiment of the present invention.

An illustrative electronic device of the type that may be provided with light sensors that receive light through openings in a device enclosure is shown in FIG. 1. Electronic device 10 may be a portable electronic device or other suitable electronic device. For example, electronic device 10 may be a laptop computer, a tablet computer, a somewhat smaller device such as a wrist-watch device, pendant device, or other wearable or miniature device, a cellular telephone, a media player, etc.

Device 10 may include a housing such as housing 12. Housing 12, which may sometimes be referred to as a case, may be formed of plastic, glass, ceramics, fiber composites, metal (e.g., stainless steel, aluminum, etc.), other suitable materials, or a combination of these materials. In some situations, parts of housing 12 may be formed from dielectric or other low-conductivity material. In other situations, housing 12 or at least some of the structures that make up housing 12 may be formed from metal elements.

Device 10 may have a display such as display 14. Display 14 may be a touch-sensitive display that includes a touch sensor or may be insensitive to touch. Touch sensors for display 14 may be formed from an array of capacitive touch sensor electrodes, a resistive touch array, touch sensor structures based on acoustic touch, optical touch, or force-based touch technologies, or other suitable touch sensor components.

Display 14 for device 10 may include display pixels formed from liquid crystal display (LCD) components or other suitable image pixel structures.

A display cover layer may cover the surface of display 14 or a display layer such as a color filter layer or other portion of a display may be used as the outermost (or nearly outermost) layer in display 14. The outermost display layer may be formed from a transparent glass sheet, a clear plastic layer, or other transparent member.

Display 14 may be mounted on a front face of housing 12. Housing 12 and display 14 may, in combination, form some or all of an enclosure for device 10. Electronic components and other internal structures such as internal support structures may be formed within the enclosure formed by display 14 and housing 12. Housing 12 may also include a rear housing member such as a metal housing member, a dielectric housing member, an additional display, or other housing structure that forms a rear surface for device 10. The rear surface of housing 12 may be a planar rear surface or may have a curved (e.g., concave, convex, or other non-planar) shape.

Display 14 may, if desired, have a display cover layer or other exterior layer that includes openings for components such as button 26. Openings may also be formed in a display cover layer or other display layer to accommodate a speaker port such as speaker port 28.

As shown in FIG. 1, the enclosure for device 10 may include openings 16. Openings 16 may be holes or clusters of holes in, for example, housing 12 and/or one or more layers of display 14 that allow light to pass through the openings onto light sensors mounted within the enclosure. Openings 16 may be formed on a front surface, a back surface, sidewalls, edges and/or other portions of the enclosure for device 10. Device 10 may include a light sensor associated with each opening 16. Each opening 16 may be formed from a patterned cluster of smaller openings in order to reduce the visibility and tactile delectability of openings 16 to a user.

Device 10 may include additional openings such as openings 18 in housing 12 that accommodate additional components such as microphones, speakers, or other electronic components.

Device 10 may be provided with any number of light sensors associated with a corresponding number of openings 16. For example, device 10 may have 10 openings, 20 openings, 50 openings, 100 openings, between 10 and 50 openings, between 50 and 150 openings, between 100 and 500 openings, more than 20 openings, more than 50 openings, more than 100 openings, or less than 50 openings (as examples). Each opening 16 (or each patterned cluster of openings) may have an associated light sensor. Light sensors may be mounted adjacent to the openings or separately from the openings. Light sensors that are mounted separately from an associated opening may have associated light guiding structures (e.g., fiber optic cables, coherent fiber bundles, or machined light-reflecting cavities) that guide light from the associated opening 16 to that light sensor.

Figure 2:
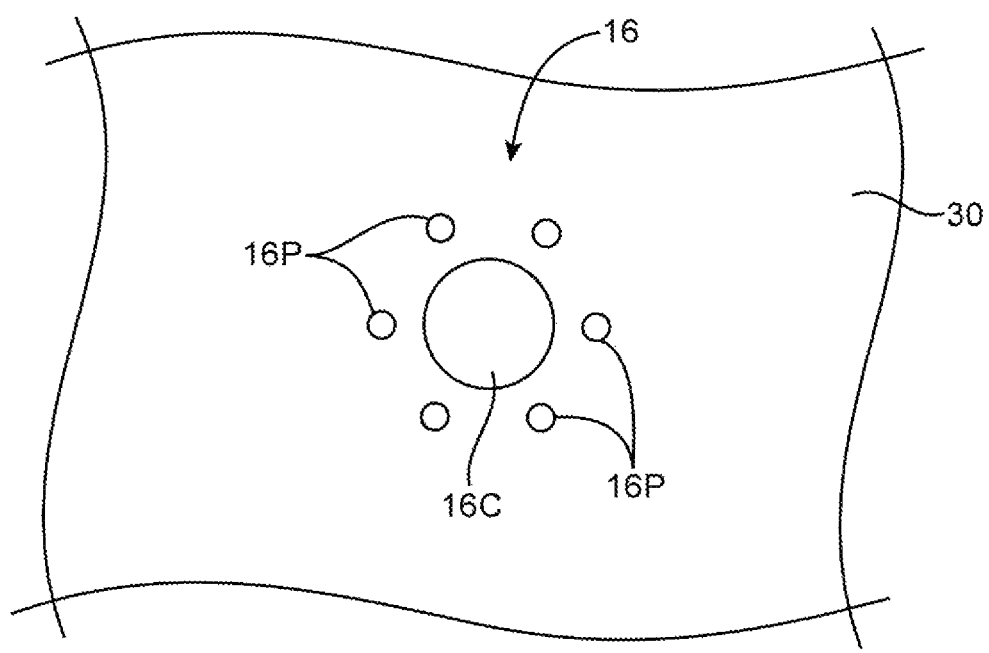
FIG. 2 is a top view of a portion of an illustrative device enclosure having openings that allow light to pass through the enclosure onto a light sensor in accordance with an embodiment of the present invention.

FIG. 2 is a top view of a portion of an enclosure for device 10 showing how openings 16 in enclosure structure (e.g., housing 12, display 14, or other housing structures for device 10) may be formed from a patterned cluster of smaller openings. In the example of FIG. 2, opening 16 is formed from a central opening 16C and six peripheral openings 16P.

Peripheral openings 16P may have a width that is smaller than the width of central opening 16C. Central opening 16C may, for example, be a circular opening having a diameter that is between 0.3 mm and 0.6 mm, between 0.3 mm and 0.5 mm, between 0.2 mm and 1 mm, less than 1 mm, or greater than 0.05 mm (as examples). Peripheral openings 16P may be circular openings each having a diameter that is smaller than the diameter of central opening 16C. The diameter of peripheral openings 16P may, as examples, be between 0.1 mm and 0.5 mm, between 0.1 mm and 0.4 mm, between 0.1 mm and 1 mm, less than 1 mm, or greater than 0.01 mm. However, the arrangement of holes that make up opening 16 in FIG. 2 is merely illustrative. If desired, other arrangements may be used.

As examples, opening 16 may be formed from a single central opening 16C without any peripheral openings, from peripheral openings such as openings 16P without a central opening, from a central opening and more than six peripheral openings or from a central opening and less than six openings. Peripheral openings 16P may have a common diameter or may have various different diameters. Peripheral openings 16P may have a common shape (e.g., circular) or may have various different shapes. Peripheral openings 16P and central opening 16C may each be circular, square, rectilinear, oval, or may have any other suitable shape.

Figure 3:
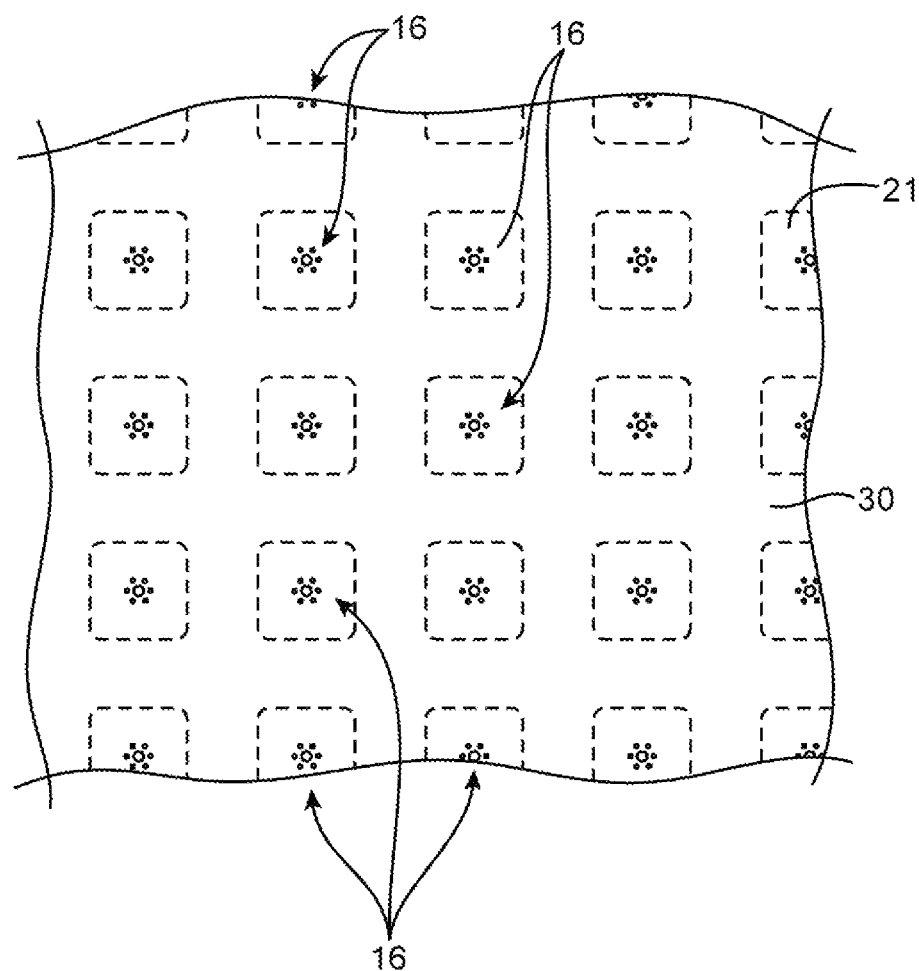
FIG. 3 is a top view of a portion of an illustrative electronic device showing how a device enclosure may include multiple openings made up of clusters of smaller openings that allow light to pass through the openings in accordance with an embodiment of the present invention.

As shown in FIG. 3, openings 16 may be formed in a grid of openings 16 on structure 30. For example, a grid of openings 16 of the type shown in FIG. 3 may be formed across display 14 or across a rear surface of device 10. Sensor structures 21 may be formed behind each opening 16. Sensor structures 21 may be a light sensor (e.g., a proximity sensor or an ambient light sensor) mounted to a printed circuit such as a printed circuit board directly behind openings 16 or sensor structures 21 may be light guiding structures that guide light from openings 16 to a light sensor located separately from openings 16.

Figure 4:
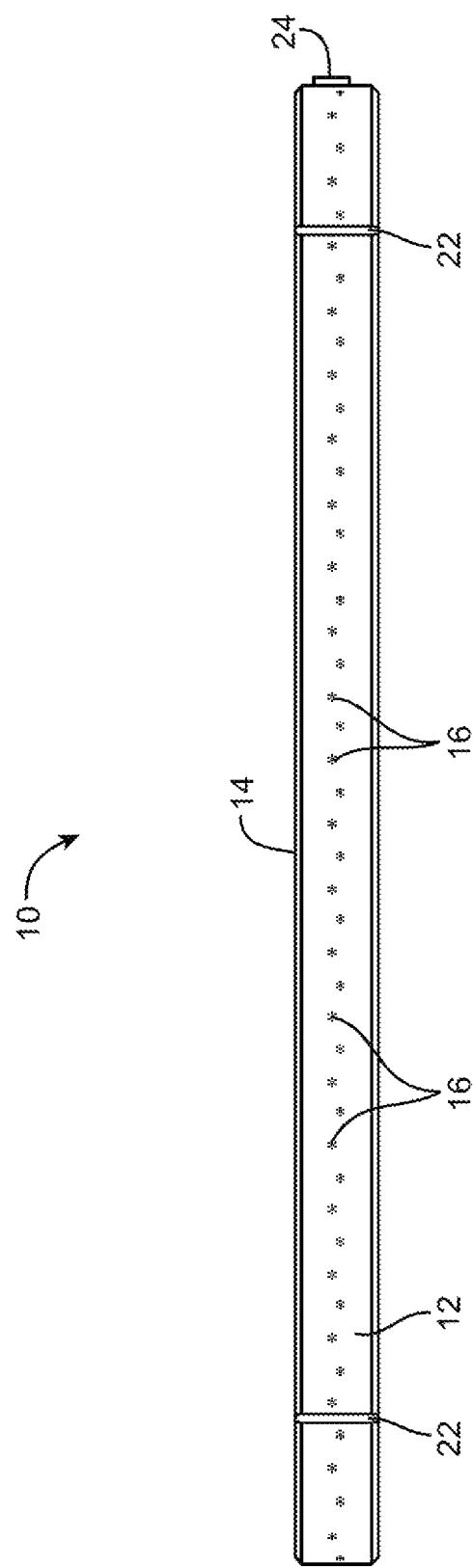
FIG. 4 is a side view of an illustrative electronic device having staggered clusters of openings in an edge portion of a device housing that allow light to pass through the edge portion of the housing in accordance with an embodiment of the present invention.

As shown in FIG. 4, openings 16 may be formed in a pattern other than the grid-like pattern of FIG. 3. In the example of FIG. 3, openings 16 (e.g., patterned clusters of openings) are formed in a staggered pattern along a peripheral edge portion of housing 12 (e.g., a housing sidewall member such as an aluminum housing sidewall). Openings 16 may be mechanically drilled openings, laser drilled openings, molded openings or openings formed using other methods.

If desired, housing 12 may include separators 22 and additional openings for user input devices such as button 24. Button 24 may be a power button for device 10. Separators 22 may, for example, be insulating members that separate aluminum portions of housing 12 to prevent electrical coupling between portions of housing 12.

A staggered pattern of openings of the type shown in FIG. 4 may be arranged to match a staggered pattern of internal light guiding structures such as staggered light-reflecting cavities within the enclosure of device 10. The light-reflecting cavities may guide light from alternating openings 16 to light sensors mounted on alternating sides of a printed circuit board within the enclosure for device 10.

Figure 5:
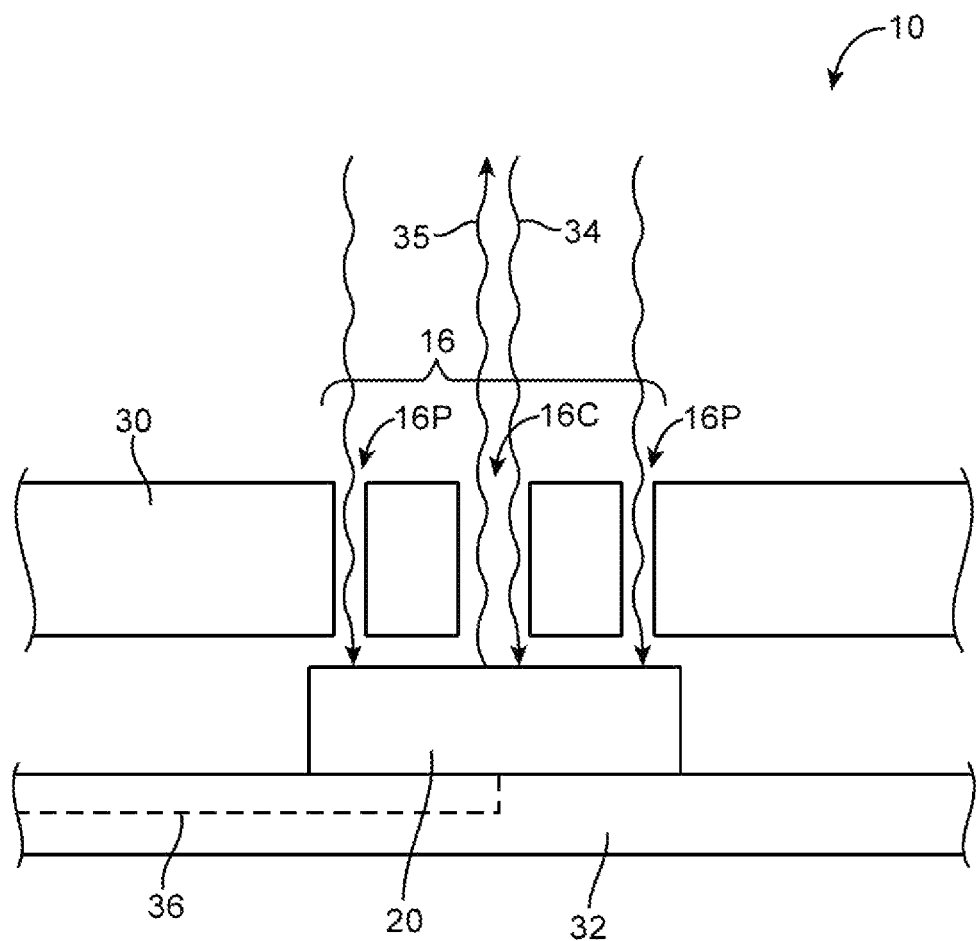
FIG. 5 is a cross-sectional side view of a portion of an illustrative electronic device in the vicinity of a light sensor that is mounted adjacent to openings in the device enclosure in accordance with an embodiment of the present invention.

In some portions of device 10, light sensors may be mounted directly under openings 16 as in the example of FIG. 5. As shown in FIG. 5, light sensor 20 receives light 34 through opening 16 (e.g., through a patterned cluster of openings such as openings 16P and 16C. Light sensor 20 may be an ambient light sensor that detects light 34 that originates outside of enclosure structure 30 or light sensor 20 may be a proximity sensor that emits light 35 (e.g., infrared light) out of enclosure structure 30 through opening 16 and detects a reflected portion of emitted light 35 that passes back through opening 16. Light sensor 20 may be mounted on circuit substrate such as circuit substrate 32. Light sensor 20 may generate proximity data related to the proximity of an object in the vicinity of device 10 in response to the received reflected portion of light 35.

Additional circuitry within device 10 (e.g., a printed circuit such as circuit substrate 32 or other electronic components mounted to circuit substrate 32) may control the operation of device 10 using the generated proximity data or using ambient light data generated by an ambient light sensor associated with sensor 20. For example, the brightness of images displayed on display 14, an operational mode for device 10, display content displayed on display 14, the volume of audio output generated by device 10, or other aspects of the operation of device 10 may be modified based on user-motions, user hand positions, or other user input data gathered using one or more light sensors 20.

Circuit substrate 32 may be a flexible printed circuit, a rigid printed circuit board, a portion of a display (e.g., a display glass layer having conductive traces such as a thin-film-transistor layer of a display), or other circuitry within device 10. Circuit substrate 32 may include conductive traces 36 that convey signals between light sensor 20 and other circuitry in device 10.

In the example of FIG. 5, openings 16 are air-filled openings that are free of filler material. However, this is merely illustrative. If desired, openings 16 may be filled or partially filled as shown in FIG. 6.

Figure 6:
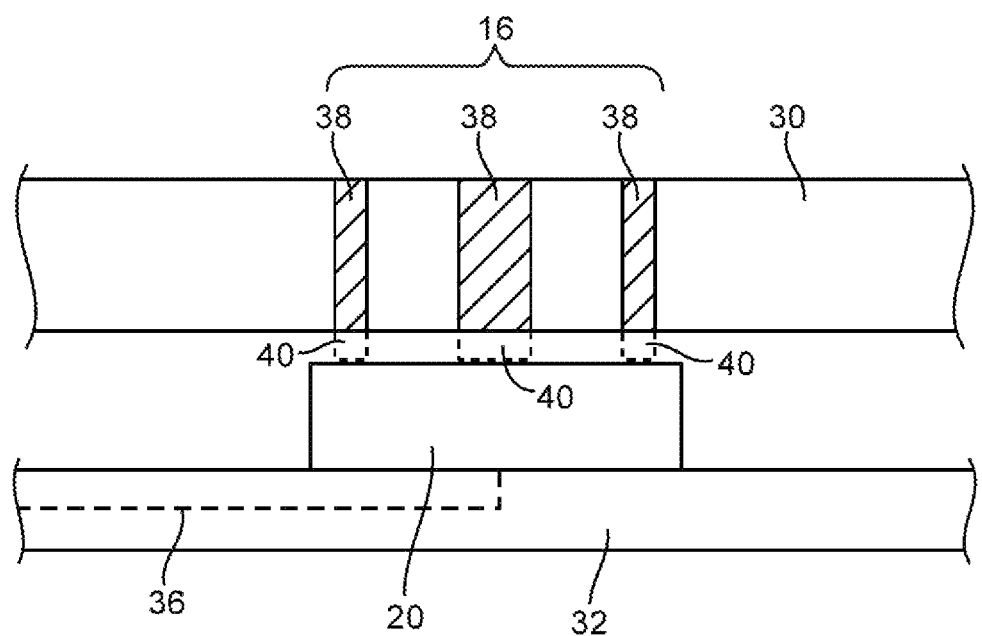
FIG. 6 is a cross-sectional side view of a portion of an illustrative electronic device in the vicinity of a light sensor showing how openings in the device enclosure may be filled with light guiding structures in accordance with an embodiment of the present invention.

As shown in FIG. 6, openings 16 may be filled with transparent material 38. Transparent material 38 may be glass or transparent plastic that prevents environmental materials such as air and water from entering device 10 through openings 16. Transparent material 38 may be a transparent filler material or may be a material with light guiding properties. For example, transparent material 38 may be formed from one or more fiber optic structures that guide light through openings 16 by total internal reflection within material 38. If desired, transparent material 38 may include portions 40 that extend beyond openings 16 into the interior of device 10 so that light may be guided directly to or directly from the surface of sensor 20. In the example of FIG. 6, extended portions 40 extend from openings 16 in structure 30 to a sensor that is mounted adjacent to openings 16. However, this is merely illustrative. If desired, transparent material 38 may be used to form light guiding structures that guide light to and/or from a light sensor that is mounted in other locations in device 10.

Figure 7:
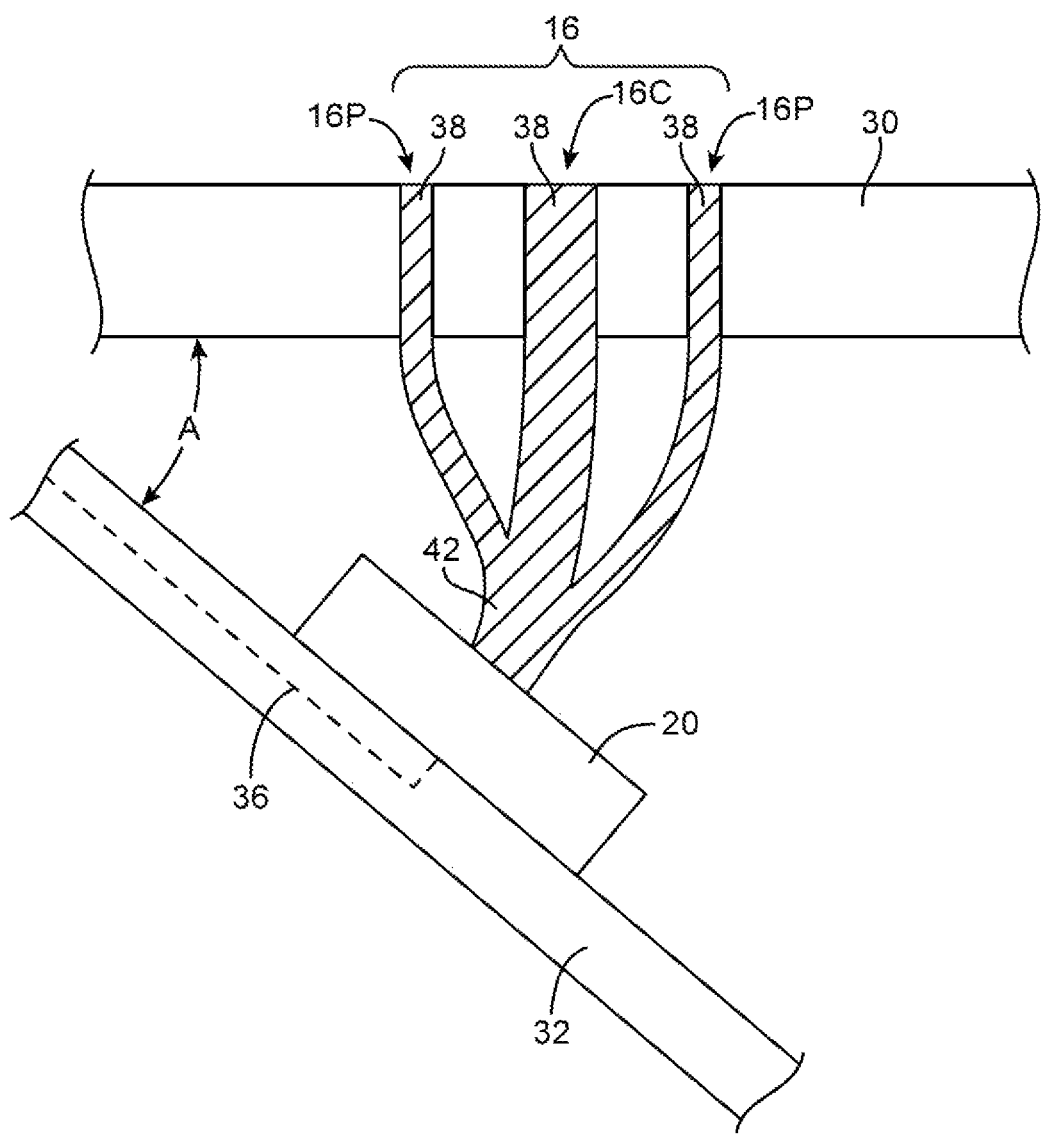
FIG. 7 is a cross-sectional side view of a portion of an illustrative electronic device in the vicinity of a light sensor showing how light guiding structures may guide light from openings in the device enclosure to a light sensor that is mounted separately from the openings in accordance with an embodiment of the present invention.

As shown in the example of FIG. 7, transparent material 38 may be used to form a coherent light guiding bundle of fiber optic structures such as coherent bundle 42. Coherent bundle 42 may guide light to and/or from a light sensor 20 that is separated from openings 16. For example, a light sensor such as light sensor 20 may be attached to a printed circuit such as printed circuit 32 that is mounted at an angle such as angle A with respect to structure 30. Angle A may be any acute or obtuse angle.

Coherent bundle 42 may include a portion that is mounted to a surface of sensor 20 and one or more branches that extend from that portion into openings 16 (e.g., into central opening 16C and one or more peripheral openings 16P). However, this is merely illustrative. If desired, separate fiber optic light guiding structures may me mounted to the surface of sensor 20 (e.g., a fiber optic light guide from each of openings 16P and 16C may be mounted to sensor 20) or other light guiding structures may be used to guide light to sensors such as sensor 20.

Figure 8:
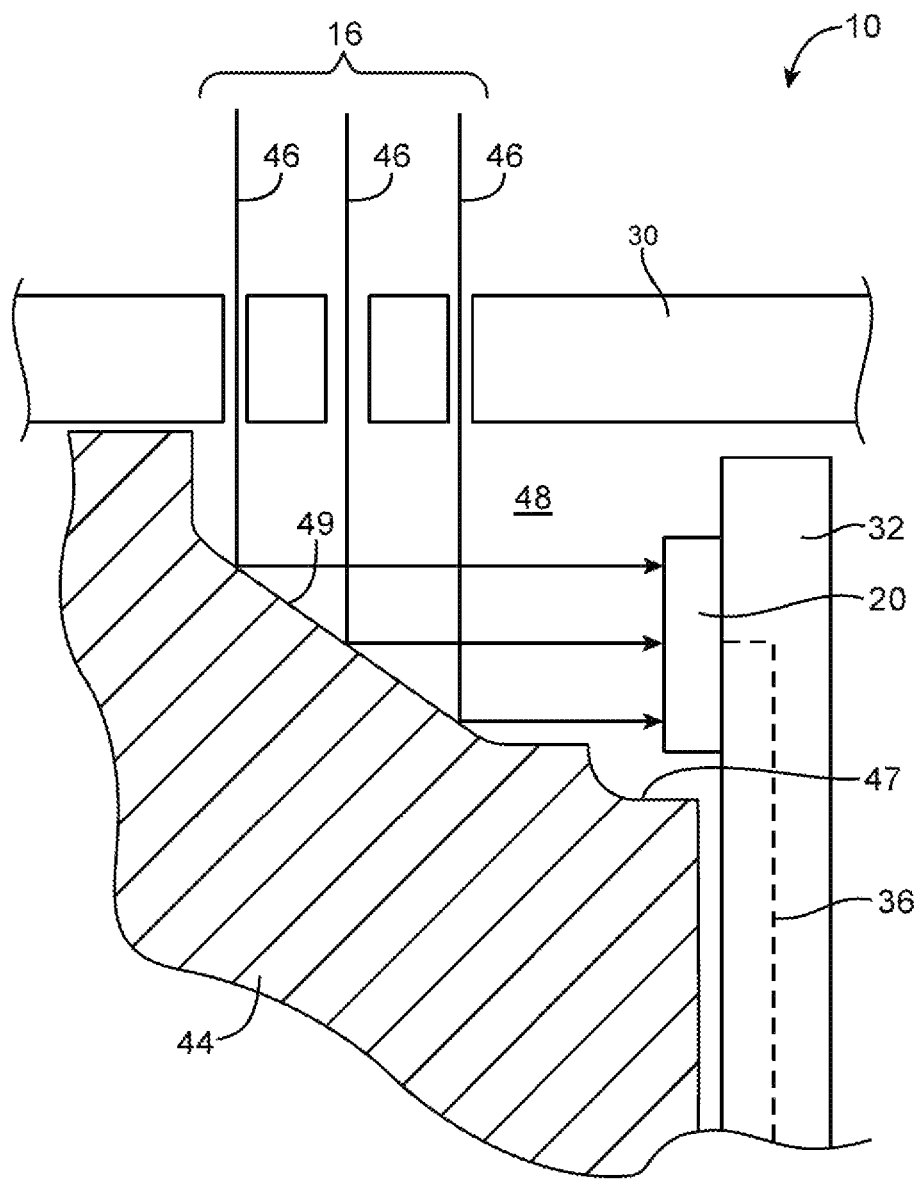
FIG. 8 is a cross-sectional side view of a portion of an illustrative electronic device in the vicinity of a light sensor showing how a cavity in an internal support structure may guide light from openings in the device enclosure to the light sensor in accordance with an embodiment of the present invention.

FIG. 8 is a cross-sectional view of a portion of device 10 showing how a reflective cavity in an internal device structure may be used to guide light to light sensors (e.g., proximity sensors and ambient light sensors) within device 10. As shown in FIG. 8, an internal structure such as internal support structure 44 may include a cavity such as cavity 48. Support structure 44 may, for example, be a support structure to which internal components such as batteries, printed circuit boards, cameras, antennas, or other components are mounted. Structure 44 may be formed from metal (e.g., aluminum), plastic, ceramics, other materials or combinations of materials. Configurations in which structure 44 is formed from aluminum are sometimes described herein as examples.

Cavity 48 in structure 44 may, for example, be a machined cavity in structure 44 with a light-reflecting surface 49. Light-reflecting surface 49 may have a reflectivity and a shape that is configured to redirect light that enters the enclosure for device 10 through opening 16 along paths 46 onto a sensor 20 that is mounted in an orientation that is perpendicular to openings 16 and structure 30. For example, structure 30 may be a sidewall portion of housing 12 (see, e.g., FIG. 1) of device 10 and sensor 20 may be mounted to a printed circuit board such as printed circuit 32 that extends along a direction (e.g., the negative y direction of FIG. 8) that is perpendicular to the sidewall portion of housing 12 within device 10.

Cavity 48 may include an additional cutout region such as region 47 that accommodates some or all of light sensor 20 within cavity 48.

Figure 9:
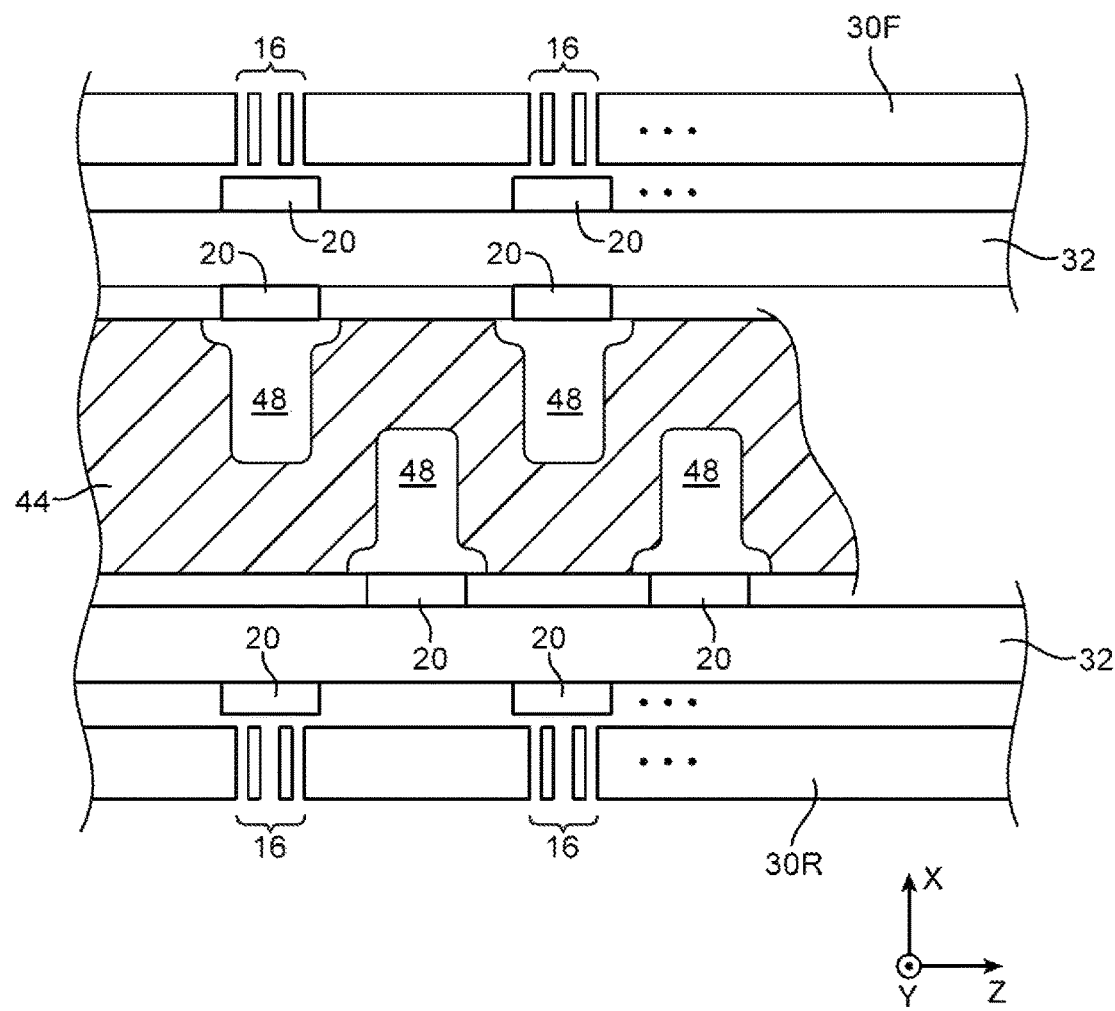
FIG. 9 is a cross-sectional side view of a portion of an illustrative electronic device showing how multiple light sensors may be mounted within multiple cavities in an internal support structure in accordance with an embodiment of the present invention.

FIG. 9 is a cross-sectional view of device 10 that is rotated with respect to the view of FIG. 8 so that cavities 48 in structure 44 can be viewed face-on (i.e., in the direction that light would enter cavities 48 through openings in a sidewall portion of housing 12 (not shown)). Light entering device 10 along the negative y direction of FIG. 8 may be reflected by cavities 48 onto respective light sensors 20 mounted on interior surfaces of one or more printed circuit boards 32. Each cavity 48 may be located adjacent to one of the staggered openings 16 in housing 12 described above in connection with FIG. 4.

Openings 16 in housing 12 may be staggered so that cavities 48 in structure 44 receive light through the staggered openings and guide the light onto sensors 20 that are mounted on multiple printed circuits 32. However, this is merely illustrative. If desired, openings 16 in housing 12 may be staggered so that cavities 48 in structure 44 can guide light onto sensors 20 that are mounted on opposing sides of a single printed circuit 32 or openings 16 in housing 12 may not be staggered.

As shown in FIG. 9, light sensors 20 may be mounted on multiple surfaces of one or more printed circuits (e.g., printed circuit boards). Light sensors on an outermost surface of a printed circuit 32 may be mounted adjacent to openings 16 in a front enclosure structure such as enclosure structure 30F or a rear enclosure structure such as enclosure structure 30R. In this way, device 10 may be provided with light sensors 20 that receive light directly through openings 16 adjacent to the sensor and light sensors 20 that receive light that is reflected from light-reflecting surfaces of light-reflecting cavities in an internal support structure within the device.

Enclosure structure 30F may, for example, be a rigid cover layer (e.g., glass layer) of display 14. Enclosure structure 30F may be a rear portion of housing 12 formed from metal (e.g., aluminum), glass, plastic or other materials or combinations of materials. Each printed circuit 32 may be provided with multiple light sensors 20 on each of two opposing surfaces of the printed circuit. Each light sensor 20 may receive light through an associated openings 16 (e.g., a cluster of openings associated with that sensor). Each opening 16 may include a central opening and peripheral openings as described above in connection with FIG. 5 and each opening 16 may include light guiding or other transparent material in the central and/or peripheral openings.

Structure 44 may include any number of light-reflecting cavities 48. Each cavity 48 may guide light from an opening 16 (e.g., a cluster of openings) onto an associated sensor 20.

Figure 10:
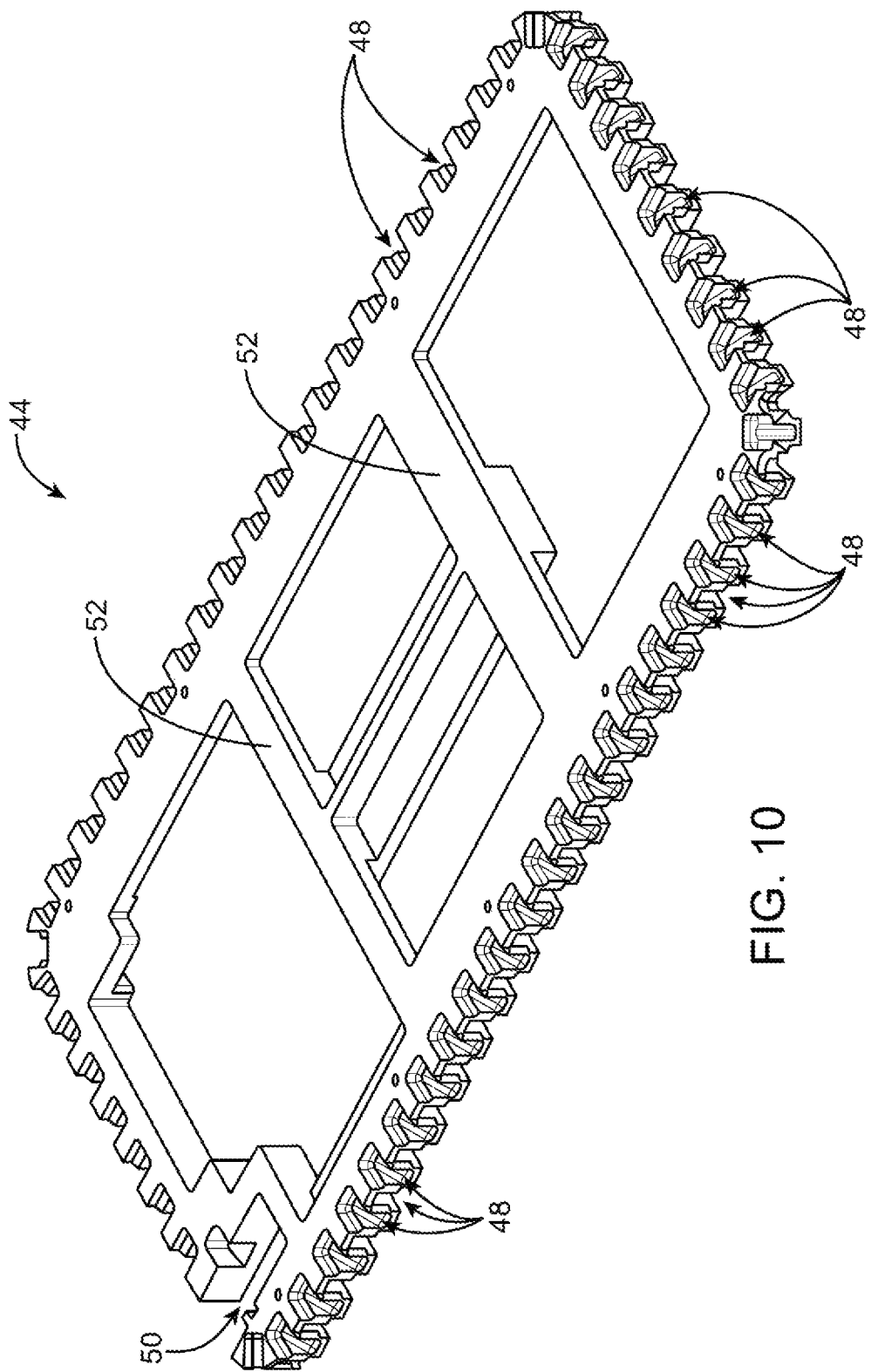
FIG. 10 is a perspective view of an illustrative internal support structure with light-reflecting cavities in accordance with an embodiment of the present invention.

FIG. 10 is a perspective view of support structure 44 showing how support structure 44 may be provided with cavities 48 around the peripheral edge of structure 44. Cavities 48 may include cavities 48 that reflect light upward onto sensors attached to a first printed circuit and cavities 48 that reflect light downward onto sensors attached to a second printed circuit (or an opposing second side of the first printed circuit).

Structure 44 may include one cavity, two cavities, three cavities, more than three cavities, more than 10 cavities, more than 100 cavities, or more than 500 cavities (as examples). Support structure 44 may include other openings such as opening 50 and support members such as support members 52. Structure 44 may be a single monolithic structure having machined cavities 48, openings 50 and support member 52 or may be formed from multiple portions that are attached together.

Figure 11:
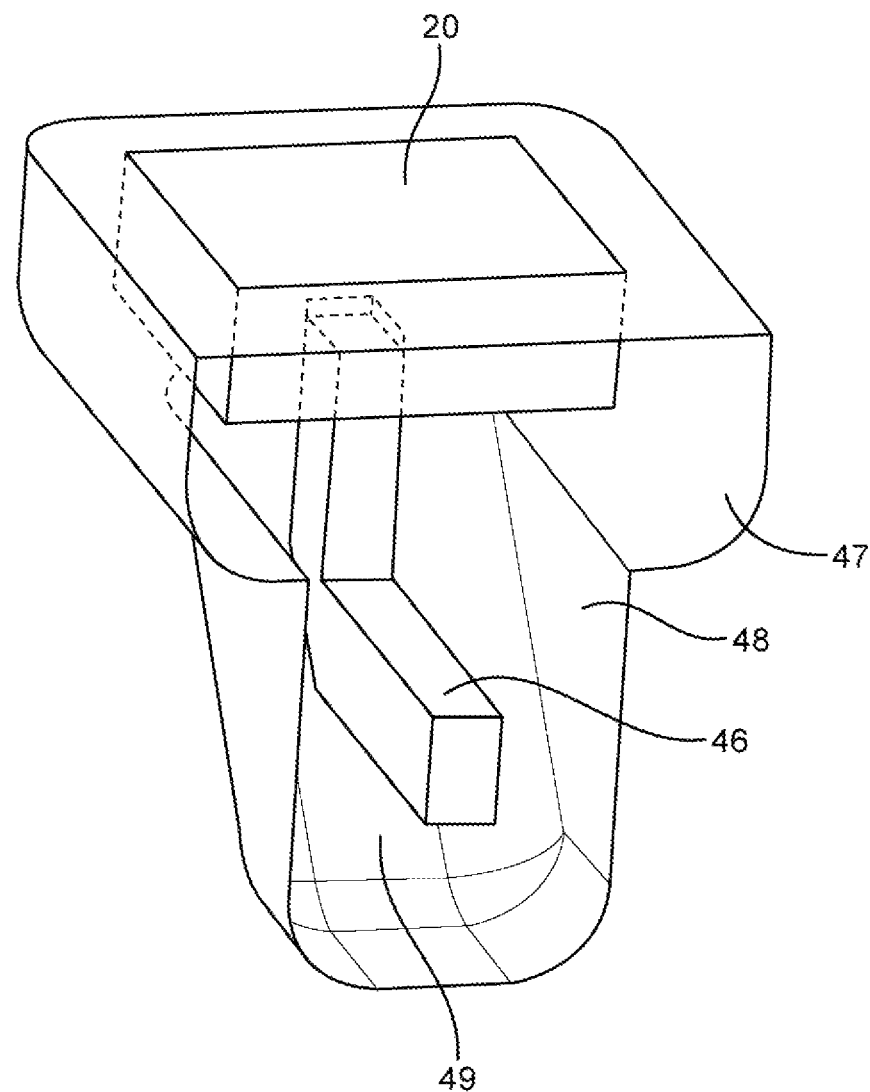
FIG. 11 is a perspective view of an illustrative light-reflecting cavity in an internal support structure showing how light may be guided within the cavity to a light sensor in accordance with an embodiment of the present invention.

FIG. 11 is a perspective view of a light-reflecting cavity such as cavity 48 showing how light sensor 20 may be mounted within the cavity. Light reflecting surface 49 of cavity 48 may redirect light that enters cavity 48 along path 46 onto light sensor 20.

Figure 12:
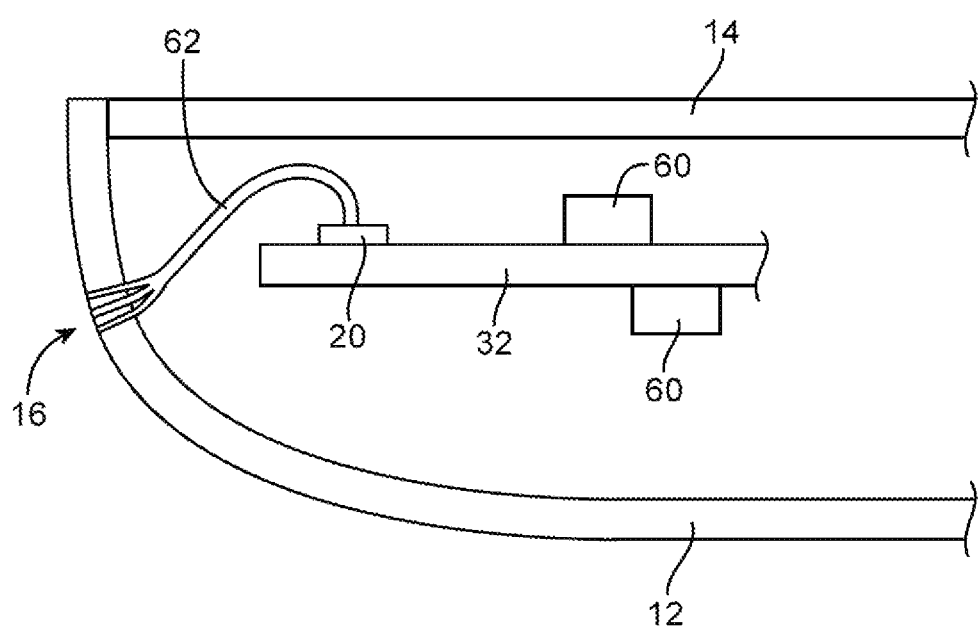
FIG. 12 is a cross-sectional view of a portion of an illustrative electronic device showing how light sensors may be mounted to a printed circuit board within a device enclosure and light guiding structures may guide light from openings in the enclosure to the light sensors on the printed circuit board in accordance with an embodiment of the present invention.

In some configurations, the enclosure for device 10 may include curved portions of housing 12 as shown in FIG. 12. In the example of FIG. 12, a portion of printed circuit 32 is mounted between a curved portion of housing 12 and an edge portion of display 14. It can be challenging to mount light sensor 20 adjacent to openings in housing 12 and or display 14 in this type of situation. Device 10 may therefore be provided with additional light guiding structures such as fiber optic structure 62 that guides light from an opening 16 (or a cluster of openings) in curved portions of housing 12 onto a light sensor that is mounted within device 10. As shown in FIG. 12, one or more light sensors 20 may be coupled to fiber optic structure 62 and mounted on a portion of printed circuit 32 that is mounted between a curved portion of housing 12 and an edge portion of display 14. Fiber optic structure 62 may have portions that fill an opening in housing 12 or may have one or more ends mounted adjacent to an opening in housing 12. As shown in FIG. 12, other components such as components 60 may also be mounted to printed circuit 32. Other components 60 may be integrated circuits, conductive traces, resistors, capacitors, inductors, volatile or non-volatile memory, or other electronic components. Components 60 and/or circuit substrate 32 may be used in operating sensors 20 and in operating device 10 using proximity data and/or ambient light data gathered using sensors 20.

Figure 13:
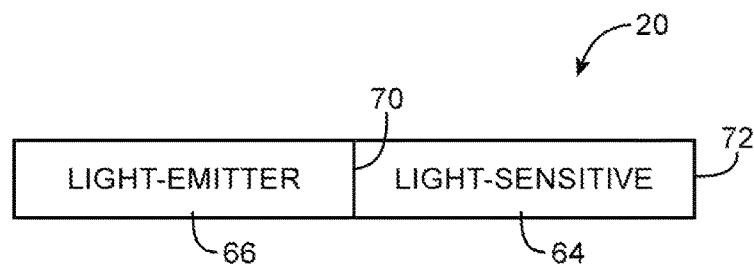
FIG. 13 is a diagram of an illustrative light sensor that is implemented as a proximity sensor having a light source and a light-sensitive component in a common package in accordance with an embodiment of the present invention.
Figure 14:
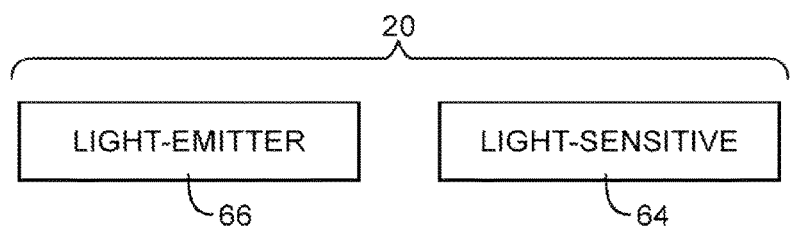
FIG. 14 is a diagram of an illustrative light sensor that is implemented as a proximity sensor having a light source and a separate light-sensitive component in accordance with an embodiment of the present invention.
Figure 15:
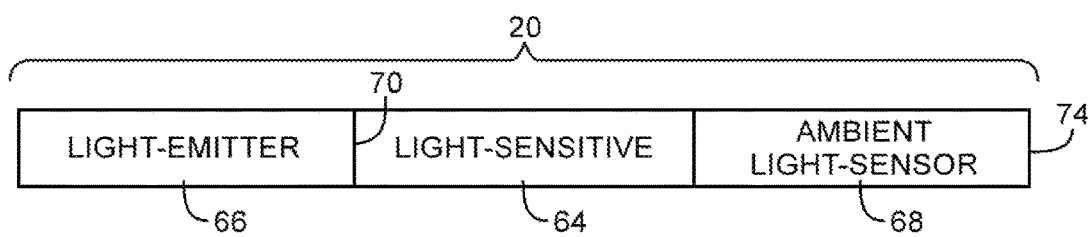
FIG. 15 is a diagram of an illustrative light sensor that is implemented as a proximity sensor and an ambient light

Illustrative configurations for light sensors 20 are shown in FIGS. 13, 14, and 15.

In the example of FIG. 13, light sensor 20 is configured as a proximity sensor having a light-sensitive portion 64 and a light-emitting portion 66. Light-sensitive portion 64 may include one or more photosensitive elements such as photodiodes or other photosensors that generate electrical signals in response to light that is incident on the light-sensitive portion. Light-sensitive portion 64 may be an infrared light sensor, a visible light sensor, or other light sensor. Light-emitting portion (light-emitter) 66 may be, for example, a light-emitting diode (LED) such as an infrared LED.

Light that is generated by light-emitting portion 66 may be emitted out of device 10 through openings such as openings 16 in the enclosure for device 10. Part of the light that is emitted through openings 16 may be reflected from an object that is in the vicinity of device 10 (e.g., a user's hand, a user's head, a user's ear, an inanimate object, a user input device, etc.). The reflected part of the light may re-enter the enclosure for device 10 through openings 16 and may be detected by light-sensitive portion 64. Light-sensitive portion 64 and light-emitting portion 66 may be separated by a wall structure such as wall 70 that prevents light from light-emitting portion 66 from directly illuminating light-sensitive portion 64. Light sensor 20 may include an exterior structure formed from ceramic, resin, plastic, metal, and/or other materials or combinations of materials that form a housing for light sensor 20. Light sensor 20 may include a substrate on which electronic components such as photosensors and/or LEDs are formed.

However, the example of FIG. 13 is merely illustrative. If desired, light sensor 20 may be configured as an ambient light sensor without any light-emitting portion or, as in the example of FIG. 14, light sensor 20 may include a separate light-sensitive portion 64 and light-emitting portion 66 (e.g., a light-sensitive portion that is separated by an air gap from a light-emitting portion).

If desired, light sensor 20 may be provided with both proximity sensing and ambient light sensing capabilities. As shown in FIG. 15, light sensor 20 may include an ambient light sensor 68 that is attached to light-sensitive portion 64 and light-emitting portion 66. Ambient light sensor 68 may include a light sensitive element (e.g., a photodiode or other photosensor) that is sensitive to light having visible wavelengths. In this way, light sensor 20 may include an infrared light sensitive element (e.g., element 64) and an optical light sensitive element. Ambient light sensor 68, light-sensitive portion 64, and light-emitting portion 66 may be formed in a common housing structure 74 (e.g., a housing structure formed from ceramic, resin, plastic, other materials or combinations of materials) or may be formed using separate ambient light sensing, infrared light sensing and infrared light emitting components.

The foregoing is merely illustrative of the principles of this invention and various modifications can be made by those skilled in the art without departing from the scope and spirit of the invention.

What is claimed is:

1. An electronic device, comprising:
   an enclosure having first and second openings;
   an internal support structure mounted within the enclosure such that the enclosure surrounds the internal support structure, wherein the internal support structure includes first and second light-reflecting cavities adjacent to the first and second openings; and
   first and second light sensors mounted in the first and second light-reflecting cavities, wherein the first light-reflecting cavity reflects light that enters the enclosure through the first opening in a first direction and onto the first light sensor and the second light-reflecting cavity reflects light that enters the enclosure through the second opening in a second direction and onto the second light sensor.

2. The electronic device defined in claim 1 wherein at least one of the first and second light sensors comprises an ambient light sensor.

3. The electronic device defined in claim 1 wherein the at least one of the first and second light sensors comprises a proximity sensor.

4. The electronic device defined in claim 3 wherein the proximity sensor comprises a light-emitting component and a light-sensitive component.

5. The electronic device defined in claim 1 wherein the enclosure comprises a housing sidewall member and wherein the first and second openings comprise openings in the housing sidewall member.

6. The electronic device defined in claim 5 wherein the housing sidewall member comprises aluminum.

7. The electronic device defined in 1 wherein the internal support structure comprises aluminum.

8. The electronic device defined in claim 7 wherein the first and second light-reflecting cavities comprise machined cavities in the internal support structure.

9. The electronic device defined in claim 1 wherein the first and second openings comprise first and second respective patterned clusters of openings.

10. The electronic device defined in claim 9 wherein at least one of the first and second patterned clusters of openings comprises a central opening and a plurality of peripheral openings that surround the central opening.

11. The electronic device defined in claim 9, further comprising transparent material in each of the patterned cluster of openings.

12. The electronic device defined in claim 11 wherein the transparent material comprises fiber optic structures in the openings.

13. An electronic device having first and second opposing surfaces and a peripheral edge surface, the electronic device comprising:
    a display;
    a housing;
    a printed circuit board having first and second opposing surfaces in the housing, the first and second opposing surfaces of the printed circuit board extending parallel to the first and second opposing surfaces of the electronic device;
    a first plurality of light sensors mounted on the first surface of the printed circuit board that receive light through openings in at least one of the first and second opposing surfaces of the electronic device; and
    a second plurality of light sensors mounted on the second surface of the printed circuit board that receive light through openings in the peripheral edge surface of the electronic device.

14. The electronic device defined in claim 13 wherein the display comprises a cover layer having a plurality of openings and wherein each of the first plurality of light sensors is mounted adjacent to at least one of the plurality of openings in the cover layer.

15. The electronic device defined in claim 14 wherein the cover layer comprises glass.

16. The electronic device defined in claim 14 wherein each of the second plurality of light sensors receives light through at least one of the openings in the peripheral edge surface of the electronic device.

17. The electronic device defined in claim 16, further comprising:
    an internal support structure having a plurality of cavities, wherein each of the plurality of cavities is adjacent to at least one of the openings in the peripheral edge surface of the electronic device.

18. The electronic device defined in claim 17 wherein each of the second plurality of light sensors is mounted within a corresponding one of the plurality of cavities.

19. An electronic device, comprising:
    an enclosure having a front surface, a rear surface, a sidewall surface, and clusters of openings in each of the front surface, the rear surface, and the sidewall surface, wherein each of the clusters of openings comprises a plurality of openings; and
    a plurality of light sensors, wherein each light sensor receives light through the plurality of openings of a corresponding one of the clusters of openings in the enclosure, wherein at least one of the clusters of openings comprises a central opening surrounded by peripheral openings, and wherein one of the plurality of light sensors emits and receives light through the central opening.

20. The electronic device defined in claim 19 wherein the central opening has a diameter, wherein the plurality of peripheral openings each have a common diameter, and wherein the diameter of the central opening is larger than the common diameter of the peripheral openings.

21. The electronic device defined in claim 19, further comprising a display having a rigid cover layer, wherein the front surface of the enclosure is formed from the rigid cover layer.

22. The electronic device defined in claim 21, further comprising a peripheral housing member, wherein the sidewall surface of the enclosure is formed from the peripheral housing member.

* * * * *